(12) United States Patent  (10) Patent No.: US 8,792,872 B2
Kleinstueck  (45) Date of Patent: Jul. 29, 2014

(54) AUDIO SYSTEM FOR A MOTOR VEHICLE

(71) Applicant: GM Global Technology Operations LLC, Detroit, MI (US)

(72) Inventor: Lutz Kleinstueck, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/683,843

(22) Filed: Nov. 21, 2012

(65) Prior Publication Data

US 2013/0130671 A1 May 23, 2013

(30) Foreign Application Priority Data

Nov. 22, 2011 (DE) .......................... 10 2011 119 095

(51) Int. Cl.
*H04M 3/00* (2006.01)
*H04H 40/00* (2008.01)

(52) U.S. Cl.
USPC .......... 455/418; 455/3.06; 705/26.41; 700/94

(58) Field of Classification Search
None
See application file for complete search history.

(56) References Cited

U.S. PATENT DOCUMENTS

| 5,573,440 | A | 11/1996 | Schneider et al. |
| 7,979,147 | B1 * | 7/2011 | Dunn .............................. 700/94 |
| 8,416,963 | B2 * | 4/2013 | Park et al. ........................ 381/86 |
| 2004/0170288 | A1 | 9/2004 | Maeda |
| 2011/0010269 | A1 * | 1/2011 | Ballard ...................... 705/26.41 |
| 2012/0106748 | A1 * | 5/2012 | Peachey et al. ................. 381/61 |

FOREIGN PATENT DOCUMENTS

| DE | 9401559 U1 | 7/1994 |
| DE | 19859712 A1 | 6/2000 |
| DE | 102008040139 A1 | 2/2010 |

OTHER PUBLICATIONS

German Patent Office, Search Report for German Application No. 102011119095.7, dated Jul. 30, 2012.

* cited by examiner

*Primary Examiner* — Erika A Washington
(74) *Attorney, Agent, or Firm* — Ingrassia Fisher & Lorenz, P.C.

(57) ABSTRACT

An audio system for a motor vehicle is provided. The system includes a radio with loudspeakers for outputting a sound pattern. The radio comprises a data connection with an engine control of the vehicle. The system also includes a mobile telephone with computer functionality, including a data connection with the radio via which audio data is transferable from the mobile telephone to the radio, and further data is transferable from the radio to the mobile telephone. This results in a sound pattern being generated which is an artificial driving noise.

12 Claims, 1 Drawing Sheet

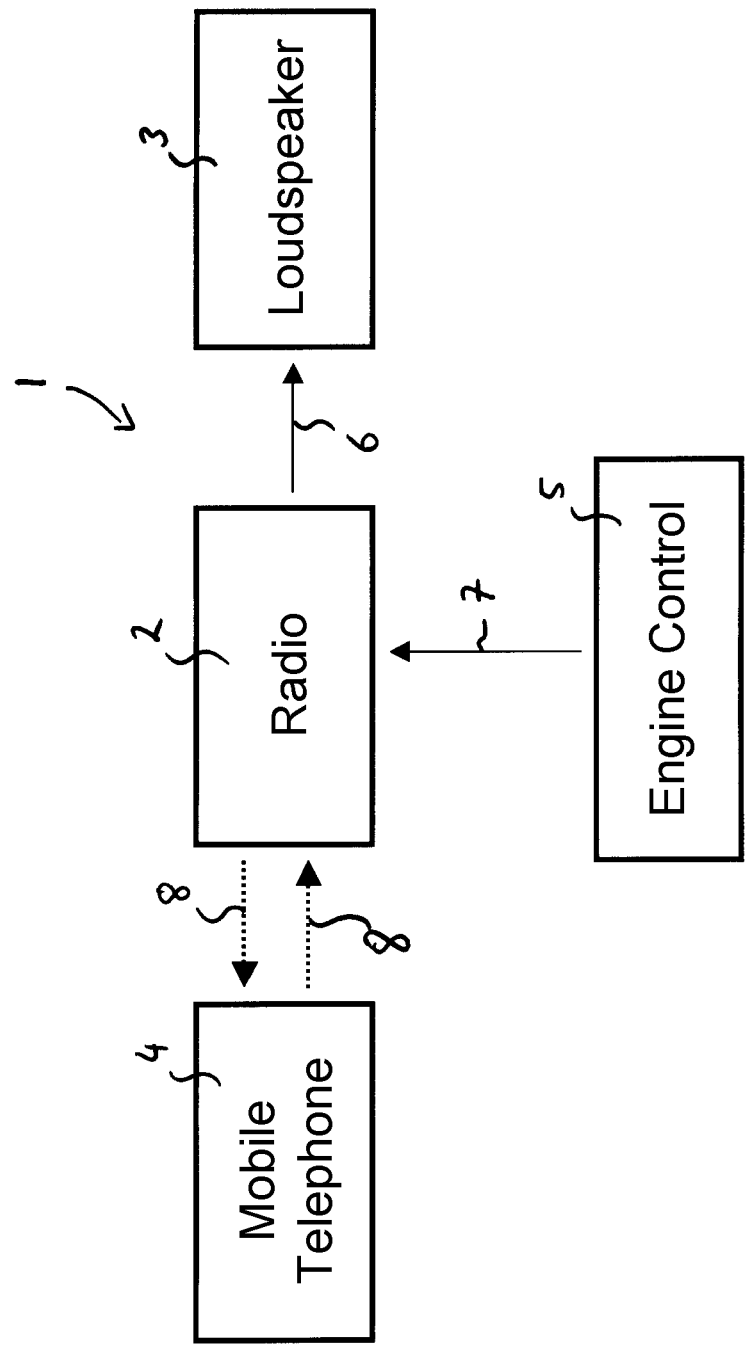

AUDIO SYSTEM FOR A MOTOR VEHICLE

CROSS-REFERENCE TO RELATED APPLICATION

This application claims priority to German Patent Application No. 10 2011 119 095.7, filed Nov. 22, 2011, which is incorporated herein by reference in its entirety.

TECHNICAL FIELD

This application pertains to an audio system for a motor vehicle for generating a sound pattern in the passenger compartment of a motor vehicle.

BACKGROUND

In particular with electrically driven motor vehicles, i.e. purely electric vehicles and hybrid vehicles, attempts have previously been made to configure the perceptible background noise in the passenger compartment of the vehicle in an advantageous manner. This includes, in particular, the generation of an artificial driving noise which is to offer passengers an equivalent to the engine noise heard by passengers in combustion engine cars but missing in electric cars.

Previously such artificial driving noises have been generated by an autonomous unit and mixed with the sound pattern output by a loudspeaker. This is known, for example, from the DE 10 2008 040 139 A1. The unit in this case must be operated by a user, in particular the unit must be switched on and off, the sound level must be regulated and the type of noise, for example the driving noise, to be generated and added, must be chosen.

Operating the unit therefore requires the user's attention, in particular if while driving, settings have to be quickly adjusted in the case of incoming telephone calls or in other special situations. Accordingly, it may be desirable to provide an improved audio system for a motor vehicle. In addition, other objects, desirable features and characteristics will become apparent from the subsequent summary and detailed description, and the appended claims, taken in conjunction with the accompanying drawings and this background.

SUMMARY

According to various aspects of the present disclosure, provided is an audio system which permits a flexible adaptation of the generated sound pattern to external situations in a technically simple manner.

Further, according to various aspects of the present disclosure, provided is a method for generating a sound pattern in the passenger compartment of the motor vehicle which demands only a minimum of attention on the part of the user.

According to one of various aspects of the present disclosure an audio system for a motor vehicle is proposed which comprises a radio with loudspeakers for outputting a sound pattern, wherein the radio includes a data connection with an engine control of the vehicle. The audio system further comprises a mobile telephone with computer functionality which includes a data connection with the radio, via which audio data is transferable in parallel from the mobile telephone to the radio and further data is transferable from the radio to the mobile telephone resulting in the generation of a sound pattern which is an artificial driving noise.

The mobile telephone is a telephone with computer functionally which can be upgraded with further functions by adding additional program (applications, apps). Such mobile telephone are also known as smart phones.

The further data transferable from the radio to the mobile telephone is, for example, data relating to the current state of driving, such as number of revolutions, speed, acceleration or yaw rate, which the radio receives from the engine control and which can be used for generating the artificial driving noise.

The audio system permits generation of an artificial driving noise by means of a mobile telephone to which data related to the current state of driving is made available. The mobile telephone generates a driving noise by means of an application (app) and transfers the corresponding audio data to the radio via the data connection. The driving noise (or a more complex sound pattern, if, for example, music is mixed in) is output by utilizing the radio and the loudspeakers which are already existing components. There is therefore no need for an autonomous unit for generating the driving noise, in one example, no additional hardware is required.

In one of various embodiments, the sound pattern may be generated from further audio data provided by the mobile telephone. These further audio data may be, in one example, music, audio books or similar contents.

With this exemplary embodiment the sound pattern is a mixture composed of the artificial driving noise and the further audio data. The further audio data may be stored in the mobile telephone and may, for example, be part of capabilities of the application.

In one exemplary embodiment the data connection from the mobile telephone to the radio is configured as a wireless connection, for example a wireless LAN connection according to the IEEE 802.11 standard or a Bluetooth connection according to the IEEE 802.15.1 standard.

According to one of various aspects of the present disclosure, a motor vehicle with audio system is provided, wherein the motor vehicle comprises an electric drive. This may be either a purely electrically driven vehicle or a hybrid vehicle.

Since electric drives do not generate any distinctly perceptible driving noise, such vehicles initially convey an unusual driving sensation and are more sensitive towards traffic noise and noises such as wind. The audio system permits a pleasing sound pattern to be generated in the passenger compartment of the vehicle, which conveys a more intuitive driving sensation and relieves the driver from having to mix individual components, for example, in order to achieve a sound pattern which is perceived as pleasing and convenient.

According to another one of various aspects of the present disclosure a method is provided for generating a sound pattern in the passenger compartment of a motor vehicle, which comprises, providing, by a mobile telephone with computer functionality, first audio data as an input signal for a radio, wherein the first audio data relates to an artificial driving noise, and generating a sound pattern from the first audio data by the radio and outputting the sound pattern by means of loudspeakers.

Further, according to one exemplary embodiment, second audio data is provided, for example music, audio books or podcasts, and the sound pattern is generated from the first and the second audio data.

In one exemplary embodiment the second audio data are provided by the mobile telephone as a further input signal for the radio.

With this exemplary embodiment the sound pattern, apart from the artificial driving noise, also comprises an entertainment component which is added in a suitable manner.

In one exemplary embodiment transfer of the first and second audio data from the mobile telephone to the radio is effected wirelessly, in one example, by means of wireless LAN or Bluetooth.

In one exemplary embodiment the radio receives data relating to the current state of driving from an engine control. This data may be used for generating an artificial driving noise reflecting the current state of driving. The data may relate, in one example, to the number of revolutions, the speed, the acceleration and the yaw rate.

In one exemplary embodiment the mobile telephone thus accesses data relating to the current state of driving from the engine control for generating the first audio data.

In one exemplary embodiment the sound pattern may be manipulated by the user. In one example, he may select level of sound in total or level of sound of individual components, mixing ratio, type of music and of artificial driving noise, and adapt these to suit individual requirements.

According to one of various aspects of the present disclosure a computer program product is provided which when executed on a computer unit of an audio system of a vehicle instructs the computer unit to perform the following: providing, by a mobile telephone with computer functionality, first audio data as the input signal for a radio, wherein the first audio data relates to an artificial driving noise, and generating a sound pattern from the first audio data by the radio and outputting the sound pattern by means of loudspeakers.

The computer program product may, in one example, be a smart phone application (app) which can be downloaded from the internet to the mobile telephone.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 shows an exemplary embodiment of the audio system 1 for a motor vehicle, which comprises a radio 2 with loudspeakers 3, which are connected via a data connection 6 and are suitable for outputting a sound pattern.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The audio system 1 further comprises a mobile telephone 4 with computer functionality, which is connected with the radio 2 via a wireless data connection 8.

Furthermore the audio system 1 comprises a data connection 7 configured as a data bus from an engine control 5 to the radio 2, via which data relating to the current state of driving may be transferred to radio 2.

In operation the audio system 1 generates a sound pattern which is output in the passenger compartment of the vehicle via loudspeakers 3. The sound pattern comprises at least an artificial driving noise which produces a corresponding application on the mobile telephone from data of the engine control. To this end data relating to the current state of driving are transmitted from the engine control 5 to the radio 2 and from the radio 2 via the wireless data connection 8 to the mobile telephone 4. By means of these data the application on the mobile telephone 4 produces an artificial driving noise which in turn is transmitted via the wireless data connection 8 to the radio 2.

The sound pattern may also comprise further components, for example music, audio books, podcasts or further entertainment components, or the ringtone of the mobile telephone 4 in case of an incoming call. The entertainment components may be stored on the mobile telephone 4. By mixing the artificial driving noise with the further components, the application on the mobile telephone 4 produces the audio data of the sound pattern, which is output via loudspeakers 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An audio system for a motor vehicle comprising:
   a radio with loudspeakers for outputting a sound pattern, the radio including a data connection to an engine control of the motor vehicle and the radio receives data relating to a current state of driving of the motor vehicle from the engine control; and
   a mobile telephone with computer functionality that includes a data connection to the radio, the mobile telephone receives the data relating to the current state of driving of the motor vehicle from the radio, and the mobile telephone generates an artificial driving noise based on the data relating to the current state of driving of the motor vehicle and transmits the artificial driving noise to the radio over the data connection,
   wherein the radio receives the artificial driving noise from the mobile telephone and outputs a sound pattern based on the artificial driving noise.

2. The audio system according claim 1, wherein the sound pattern is generated from further audio data provided by the mobile telephone.

3. The audio system according to claim 1, wherein the data connection from the mobile telephone to the radio is a wireless connection.

4. The audio system according claim 3, wherein the wireless connection is configured as a wireless LAN connection.

5. The audio system according claim 3, wherein the wireless connection is configured as a Bluetooth connection.

6. A motor vehicle, comprising:
   an electric drive with an engine control;
   a radio with loudspeakers for outputting a sound pattern, the radio including a data connection to the engine control of the motor vehicle and the radio receives data relating to a current state of driving of the motor vehicle from the engine control; and
   a mobile telephone with computer functionality that includes a data connection to the radio, the mobile telephone receives the data relating to the current state of driving of the motor vehicle from the radio, and the mobile telephone generates an artificial driving noise based on the data relating to the current state of driving of the motor vehicle and transmits the artificial driving noise to the radio over the data connection, wherein the radio receives the artificial driving noise from the mobile telephone and outputs a sound pattern based on the artificial driving noise.

7. A method for generating a sound pattern in the passenger compartment of a motor vehicle, comprising the following:

receiving data relating to a current state of driving of the motor vehicle from an engine control at a radio of the motor vehicle;

transmitting the data relating to the current state of driving of the motor vehicle from the radio to a mobile telephone with computer functionality over a data connection;

generating with the mobile telephone first audio data as an input signal for a radio based on the data relating to the current state of driving of the motor vehicle, wherein the first audio data relates to an artificial driving noise;

generating a sound pattern from the first audio data by the radio; and outputting the sound pattern by means of loudspeakers.

8. The method according to claim 7, further comprising:
providing second audio data; and
generating the sound pattern from the first audio data and second audio data.

9. The method according to claim 8, wherein the second audio data is provided by the mobile telephone as a further input signal to the radio.

10. The method according to claim 8, wherein transfer of the first audio data and second audio data from the mobile telephone to the radio is effected wirelessly.

11. The method according to claim 7, wherein the sound pattern is manipulable by a user.

12. A computer program product, comprising:

a tangible computer-readable medium readable by a computer unit of an audio system of a motor vehicle and storing instructions for execution by the computer unit for performing a method comprising:

receiving data relating to a current state of driving of the motor vehicle from an engine control at a radio of the motor vehicle;

transmitting the data relating to the current state of driving of the motor vehicle from the radio to a mobile telephone with computer functionality over a data connection;

providing, with the mobile telephone with computer functionality, first audio data as an input signal for the radio, wherein the first audio data relates to an artificial driving noise generated by the mobile telephone based on the data relating to the current state of driving of the motor vehicle;

generating a sound pattern from the first audio data by the radio; and outputting the sound pattern by means of loudspeakers.

* * * * *